United States Patent
Purdy et al.

(10) Patent No.: US 7,520,543 B2
(45) Date of Patent: Apr. 21, 2009

(54) DOOR HANDLE ASSEMBLY

(75) Inventors: William A. Purdy, Richton Park, IL (US); Chad Anderson, Ypsilanti, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/508,622

(22) Filed: Aug. 23, 2006

(65) Prior Publication Data

US 2006/0284430 A1 Dec. 21, 2006

Related U.S. Application Data

(63) Continuation of application No. 11/397,374, filed on Apr. 4, 2006.

(60) Provisional application No. 60/680,921, filed on May 13, 2005.

(51) Int. Cl.
*E05B 3/00* (2006.01)
(52) U.S. Cl. ............................. 292/336.3; 292/DIG. 31
(58) Field of Classification Search .............. 292/336.3, 292/348, DIG. 65, DIG. 64, DIG. 38, DIG. 27, 292/DIG. 53, DIG. 56; 16/110.1–114.1, 16/405–430
See application file for complete search history.

(56) References Cited

U.S. PATENT DOCUMENTS

| 5,129,694 | A | | 7/1992 | Tanimoto et al. | |
|---|---|---|---|---|---|
| 5,493,756 | A | | 2/1996 | Shanok et al. | |
| 5,659,927 | A | | 8/1997 | Shanok et al. | |
| 5,794,994 | A | * | 8/1998 | Miyagawa et al. | 292/336.3 |
| 5,895,081 | A | | 4/1999 | Tanimoto et al. | |
| 6,167,779 | B1 | * | 1/2001 | Sano et al. | 74/543 |
| 6,415,478 | B1 | * | 7/2002 | Watanabe et al. | 16/444 |
| 6,612,630 | B1 | * | 9/2003 | Meinke | 292/348 |
| 6,768,413 | B1 | * | 7/2004 | Kemmann et al. | 340/5.72 |
| 6,988,752 | B2 | * | 1/2006 | Belchine et al. | 292/336.3 |
| 7,066,506 | B2 | * | 6/2006 | Pudney | 292/336.3 |
| 7,140,653 | B2 | * | 11/2006 | Kobayashi et al. | 292/348 |
| 7,270,359 | B2 | * | 9/2007 | Sparks et al. | 296/1.02 |

(Continued)

FOREIGN PATENT DOCUMENTS

DE 4109936 10/1991

(Continued)

*Primary Examiner*—Patricia L Engle
*Assistant Examiner*—Kristina R Fulton
(74) *Attorney, Agent, or Firm*—Mark W. Croll; Paul F. Donovan

(57) ABSTRACT

A door handle assembly includes a handle pivot housing and a main handle rotatably or otherwise pivotally secured within the handle pivot housing. The handle pivot housing includes handle engaging-walls defining a handle pivot cavity therebetween. At least one of the handle-engaging walls includes an integrally formed boss extending into the handle pivot cavity. The main handle includes an arm integrally formed with a pivot joint defining a pivot axis, and a counterweight. The pivot joint rotatably or otherwise pivotally secures to the boss. The counterweight and the arm are positioned on opposite sides of the pivot axis. The main handle may be configured to receive and retain a plurality of caps, which may be formed of a different material than said main handle. Each of the caps may differ in at least one of size, shape, structure, material, texture, and color. A counterweight includes a fin that abuts the cap so as to secure the cap onto the handle.

2 Claims, 5 Drawing Sheets

U.S. PATENT DOCUMENTS

| | | | |
|---|---|---|---|
| 2003/0001399 A1* | 1/2003 | Sato | 292/336.3 |
| 2005/0093306 A1* | 5/2005 | Pudney | 292/216 |
| 2005/0160559 A1* | 7/2005 | Hayashi | 16/412 |
| 2006/0028030 A1* | 2/2006 | Tanimoto et al. | 292/336.3 |
| 2006/0091680 A1* | 5/2006 | Cummins et al. | 292/336.3 |

FOREIGN PATENT DOCUMENTS

| | | |
|---|---|---|
| EP | 0587465 | 3/1994 |
| EP | 0959204 | 11/1999 |
| EP | 0974716 | 1/2000 |
| EP | 1586726 A1 * | 10/2005 |
| GB | 2203481 * | 10/1988 |
| GB | 2353245 | 2/2001 |

* cited by examiner

DOOR HANDLE ASSEMBLY

RELATED APPLICATIONS

This application is a continuation of U.S. patent application Ser. No. 11/397,374 entitled "Door Handle Assembly" filed on Apr. 4, 2006, which relates to and claims priority benefits from U.S. Provisional Patent Application 60/680,921 entitled "Vehicle Inside Door Handle" filed on May 13, 2005, both of which are hereby incorporated by reference in their entirety.

FIELD OF THE INVENTION

Embodiments of the present invention generally relate to door handles, and more particularly, to a door handle assembly that may be used as a vehicle inside door handle.

BACKGROUND OF THE INVENTION

Conventional vehicle inside door handles are susceptible to swinging open during a crash or violent maneuver. The heavier a handle is, the further away its center of gravity is from its pivot axis. The further away the center of gravity is from the pivot axis, the easier it is for the door handle to swing open during an impact. As door handles become larger and heavier, the possibility of the door handles swinging open during an impact increases. Thus, a need exists for a door handle that remains closed during an impact, despite the overall weight of the door handle.

Additionally, various vehicles include specifically designed interior door handles. For example, one automobile may have a first handle style, while another may have a different style. Typically, each different type of door handle is separately manufactured. That is, the first handle style is manufactured with a first mold, die, or the like, while a second style is manufactured with a second mold, die, or the like. Separately manufacturing each door handle with different tools increases manufacturing time and costs.

In-mold decorating is well known. However, it is generally known that inlays are bondable only to certain types of resins. In the past, in-molding door handles was not common practice because the resins necessary for bonding to the inlay were not strong enough with respect to vehicle door handle specifications.

Thus, a need exists for a system that includes components that may be universally used with all door handles. Further, a need exists for a strong door handle that may be decorative, yet robust and easy to manufacture.

SUMMARY OF THE INVENTION

Embodiments of the present invention provide a door handle assembly that may include a handle pivot housing, a main handle, and a plurality of caps configured to be interchangeably secured to the main handle. The handle pivot housing includes handle engaging-walls defining a handle pivot cavity therebetween. At least one of the handle-engaging walls includes an integrally formed boss extending into the handle pivot cavity. The main handle includes an arm integrally formed with a pivot joint defining a pivot axis. A counterweight is provided. The pivot joint rotatably secures to the boss, and the counterweight and the arm are positioned on opposite sides of the pivot axis in order to move the center of gravity closer to the pivot axis. The counterweight includes a fin that abuts the cap to secure the cap onto the handle.

The caps are configured to be snapably, latchably, or otherwise removably secured to the main handle. Each cap is formed of a different material than the main handle. Further, each cap may differ in size, shape structure, material, texture, or color with respect to other caps.

Figure 1:
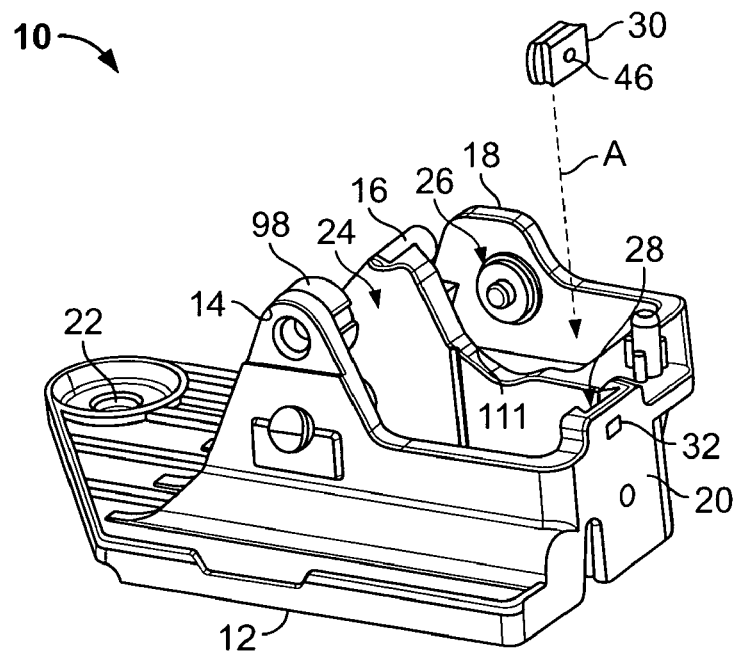
FIG. 1 illustrates an isometric rear view of a handle pivot housing according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 illustrates an isometric rear view of a handle pivot housing 10 according to an embodiment of the present invention. The housing 10 includes a lower support wall 12 integrally formed with upstanding handle-engaging walls 14 and 16, an upstanding lock wall 18, and a rear, or bumper, wall 20. The lower support walls 12 includes a fastener through-hole 22 and other features that are configured to secure the handle base 10 to a fixed structure, such as an interior of a door. A handle pivot cavity 24 is defined between the two handle-engaging walls 14 and 16, while a lock knob cavity 26 is defined between the handle-engaging wall 16 and the lock wall 18. The rear wall 20 includes a channel 28 configured to receive and retain a bumper 30. A slot, opening or depression 32 is formed through the rear wall 20 and extends into the channel 28. The slot 32 is configured to snapably secure a reciprocal structure 46 on the bumper 28, which is urged into the channel in the direction of A.

Figure 2:
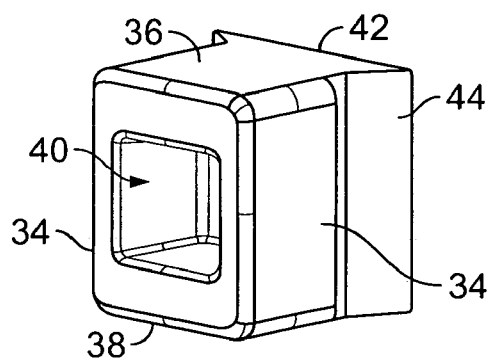
FIG. 2 illustrates an isometric front view of a bumper according to an embodiment of the present invention.

FIG. 2 illustrates an isometric front view of the bumper 30. The bumper 30 may be formed of rubber, plastic, or other such materials, and includes lateral walls 34 integrally formed with top and bottom walls 36 and 38, respectively. An inner cavity 40 may be defined between the lateral walls 34 and the top and bottom walls 36 and 38, respectively. The lateral, top, and bottom walls 34, 36, and 38, respectively are integrally formed with a channel-engaging base 42 having lateral flanges 44.

Figure 3:
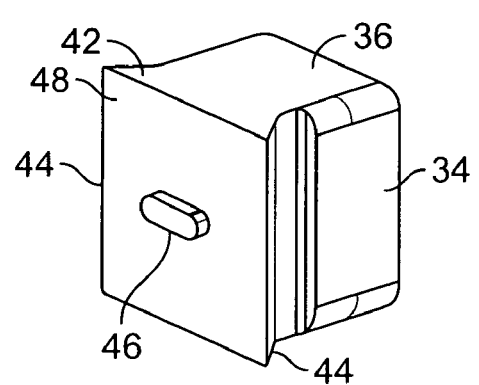
FIG. 3 illustrates an isometric rear view of a bumper according to an embodiment of the present invention.

FIG. 3 illustrates an isometric rear view of the bumper 30. A protuberance, such as a tab, 46 outwardly extends from a rear surface 48 of the channel-engaging base 42.

Figure 4:
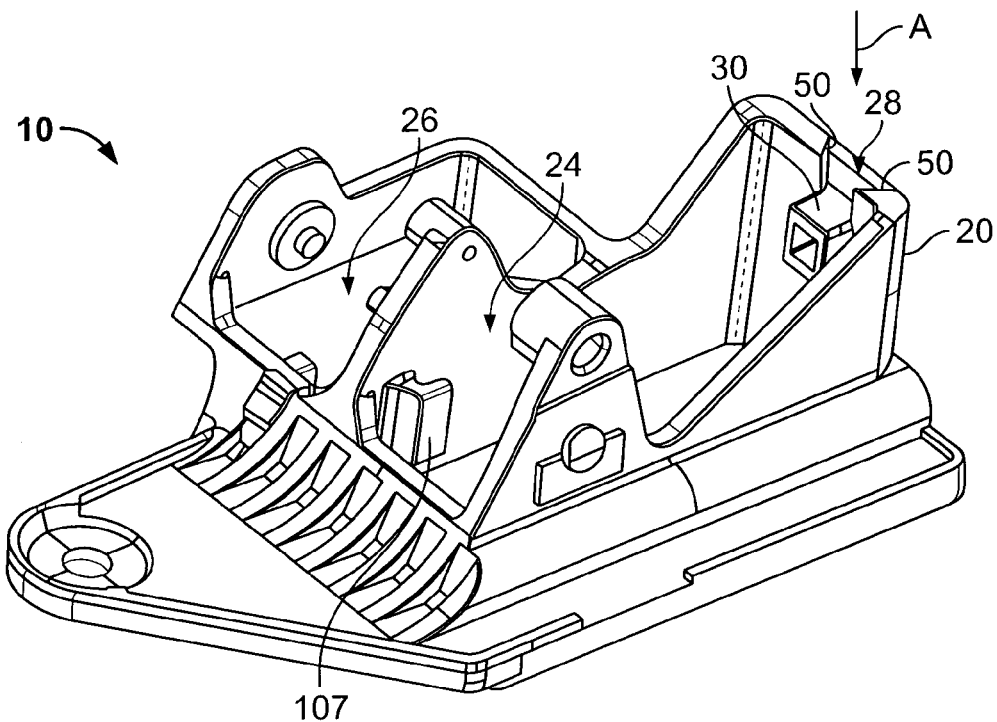
FIG. 4 illustrates an isometric front view of a handle pivot housing according to an embodiment of the present invention.

FIG. 4 illustrates an isometric front view of the handle pivot housing 10. Referring to FIGS. 1-4, the bumper 30 is urged into the channel 28 in the direction of A such that the lateral flanges 44 are slidably received in notches 50 formed in the rear wall 20. The bumper 30 continues to slide through the channel 28 in the direction of A, until the tab 46 encounters the slot 32 of the rear wall, thereby snapably securing the bumper 30 within the channel 28. The bumper 30 provides a cushioned barrier for a handle subassembly (discussed below), and particularly a counterweight (discussed below) while at rest and through rotation of the handle subassembly within the handle pivot cavity 24. While the bumper 30 is shown having the tab 46, and the slot 32 is formed through the rear wall 20, the bumper 30 may, alternatively, have a slot formed therethrough, while the rear wall 20 includes a tab extending into the handle pivot cavity 24. Optionally, the bumper 30 may be integrally formed with the rear wall 20.

Figure 5:
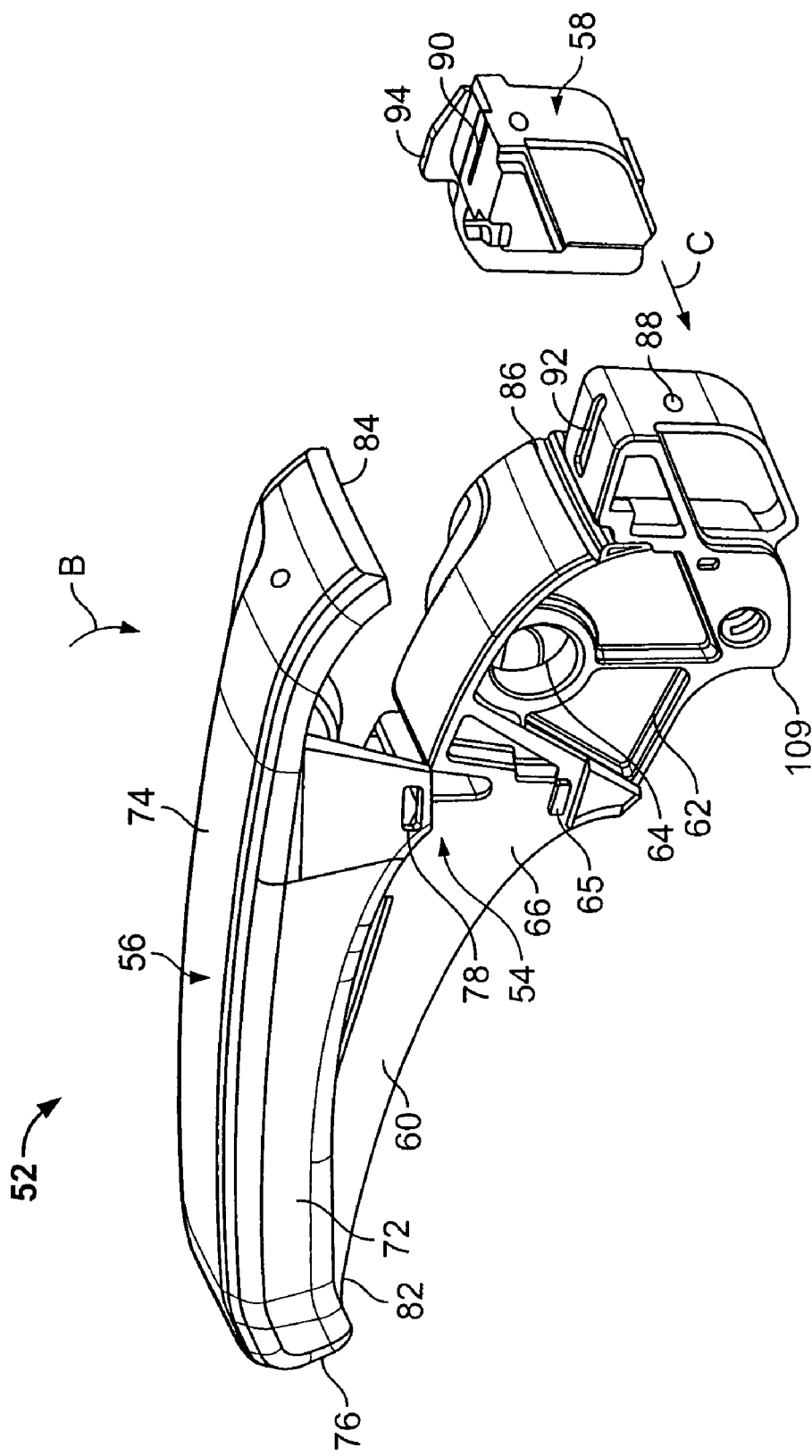
FIG. 5 illustrates an isometric exploded view of a handle subassembly according to an embodiment of the present invention.

FIG. 5 illustrates an isometric exploded view of a handle subassembly 52. The handle subassembly 52 includes a main handle 54, a cap 56, and a counterweight 58. The main handle 54 includes an arm 60 extending from a pivot joint 62. The arm 60 may be grasped by a user in order to rotate the main handle 54 when it is rotatably secured within the handle pivot housing 10. The pivot joint 62 includes a boss opening 64 configured to rotatably retain a boss extending from the handle-engaging wall 14 of the handle pivot housing 10 (shown, e.g., in FIGS. 1-4). Additionally, the main handle 54 includes one or more protuberances 65 extending from one or both lateral surfaces 66.

The cap 56 may be chrome plated, painted, molded in different colors, decorated with graphics according to any number of different methods, or, preferably, in-mold decorated. The cap 56 includes lateral walls 72 integrally formed with a top wall 74 and blunted end 76. Slots 78 may be formed through portions of at least one of the lateral walls 72. The cap 56 is configured to snapably, latchably, or otherwise removably secure to the main handle 54 by way of the slots 78 securely engaging the protuberances 65 of the main handle 54. In particular, the blunted end 76 of the cap 56 is positioned around a portion of the distal end 82 of the main handle 54, and the cap 56 is pivoted in the direction of arc B about the distal end 82, until the slots 78 snapably secure around the protuberances 65, and the proximal lip 84 of the cap 56 snapably secures around a corresponding edge 86 of the main handle 54. Additionally, the blunted end 76 of the cap 56 may snapably, latchably, or otherwise engage around a corresponding structure located at the distal end 82 of the main handle 54. Alternatively, the protuberances 65 of the main handle 54 may be slots, while the slots 78 of the cap 56 may be protuberances. In other embodiments, corresponding structure on the cap and the handle may be utilized for a snap-fit or other latching arrangements.

A variety of caps 56 having different ornamentation and styles may be used with the handle subassembly 52. Each cap 56 may include slots, tabs, and the like that allow it to secure to the main handle 54. Thus, one type of main handle 54 may be manufactured, and a wide variety of caps 56 may be used with that type of main handle 54.

The main handle 54 may be manufactured from a different material than the cap 56, because the main handle 54 is separate and distinct from the cap 56. For example, the main handle 54 may be formed of a relatively strong material, such as plastic or glass-filled nylon with mineral additives; while the cap may be made with a different material suitable for decoration, such as a compounded thermoplastic, like ABS or similar materials. Despite the nature of the cap 56, the handle subassembly 52 meets desired vehicle door handle specifications because of the strength of the underlying main handle 54.

Once the cap 56 is secured to the main handle 54, the counterweight 58 is urged into a counterweight housing 88 extending from a proximal end of the pivot joint 62 in the direction of C. The counterweight 58 may be made of any suitable material, such as, for example, a zinc alloy, aluminum, or the like. The handle subassembly 52 is configured to receive the counterweight 58 through the housing 88, support, end, or the like, in order to provide an anti-opening assembly. A fin 94 extends upwardly from the counterweight 58. The counterweight 58 is moved into the housing 88 until an upper tab 90 snapably secures into a corresponding slot 92 of the housing 88. The counterweight 58 and housing 88 may also include additional features that assist in securing the counterweight into the housing 88. Optionally, the counterweight 58 may include a slot, while the housing 88 includes a corresponding tab. Alternatively, the counterweight 58 and the housing 88 may be integrally formed as a single unit. Also, the counterweight 58 may be secured to the handle subassembly in a variety of ways. For example, the counterweight 58 may be snapped onto the housing 88 from above or below, and/or the counterweight 58 may be bonded or latched to the housing 88.

Figure 6:
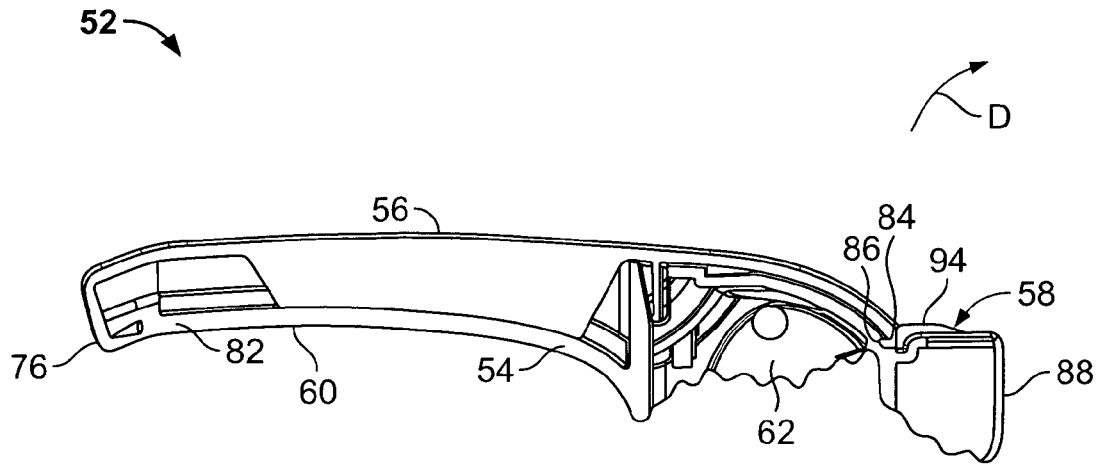
FIG. 6 illustrates a partial lateral view of a handle subassembly according to an embodiment of the present invention.

FIG. 6 illustrates a partial lateral view of the handle subassembly 52. As shown in FIG. 6, once the counterweight 58 is secured within the housing 88, the fin 94 abuts the lip 84 of the cap 56, thereby securing the cap 56 into position. As such, the main handle 54 and cap 56 are precluded from rotating in the direction of arc D with respect to the counterweight 58 and housing 88. The lock created by the fin 94 abutting the lip 84 ensures that the cap 56 remains on the main handle 54 during thermo-cycle testing, material thermo-expansion and contraction and operation.

Figure 7:
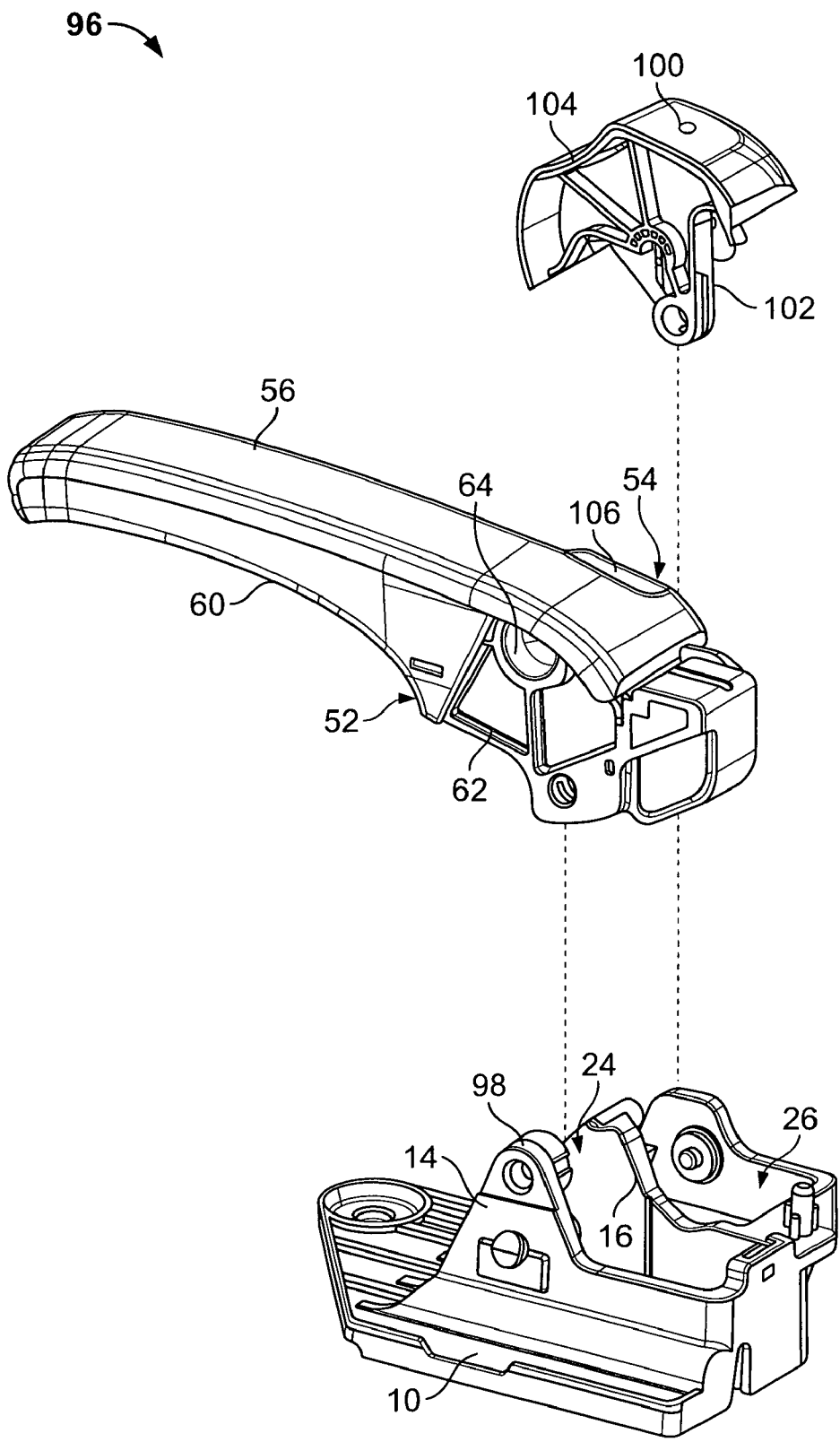
FIG. 7 illustrates an isometric exploded view of a handle assembly according to an embodiment of the present invention.

FIG. 7 illustrates an isometric exploded view of a handle assembly 96. In order to assemble the handle assembly 96, the pivot joint 62 of the handle subassembly 52 is positioned in the handle pivot cavity 24 of the handle pivot housing 10 such that the boss opening 64 securely and rotatably engages the boss 98 extending from the handle engaging wall 14. The boss 98 is integrally molded with the handle pivot housing 10. A lock knob 100 is then secured within the lock knob cavity 26 of the handle pivot housing 10. The lock knob 100 includes a lateral wall 102 integrally formed with an arcuate upper wall 104. The arcuate upper wall 104 overlays a portion 106 of the main handle 54 or cap 56.

After the handle assembly 96 is assembled, the handle subassembly 52 may pivot about the boss 98. The lock knob 100 can assist to ensure that the handle subassembly 52 remains rotatably secured to the boss 98. That is, the lock knob 100 can act as a barrier past which the handle subassembly 52, particularly the portion 106 covered by the upper arcuate wall 104, cannot slide past.

Figure 8:
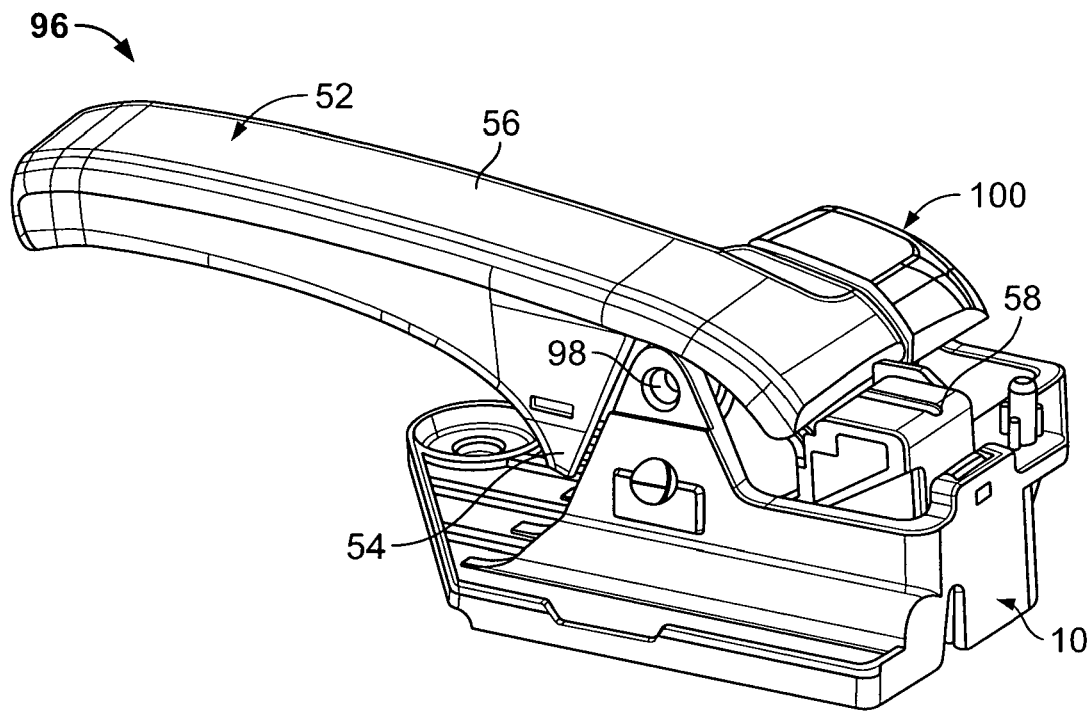
FIG. 8 illustrates an isometric view of a handle assembly according to an embodiment of the present invention.

FIG. 8 illustrates an isometric view of the handle assembly 96. As shown in FIGS. 5-8, the counterweight 58 is positioned on the opposite side of the pivot axis (that is, the boss 98) from the arm 60. The position of the counterweight 58, therefore, moves the center of gravity of the handle subassembly 52 closer to the pivot axis. Additionally, the cap 56 may be removed and another cap, having a different design, ornamentation, surface, or formed of a different material, may be secured to the main handle 54.

Referring to FIGS. 4-8, the handle assembly 96 may include a plurality of positive stops. For example, the pivot housing 10 may include a protruding block 107 (shown, for example, in FIG. 4) configured to abut a curved lower tip 109 (shown, for example, in FIG. 5) of the handle assembly 52. When the handle subassembly 52 is rotated relative to the handle pivot housing 10, the curved lower tip 109 is rotated into abutment with the block 107, thereby halting further rotation. Additionally, the handle pivot housing 10 may include a ramped surface 111 (shown, for example, in FIG. 1) that is steeper than adjoining surfaces. When the handle subassembly 52 is rotated relative to the handle pivot housing 10, the inside edge 86 (shown, for example, in FIG. 5) may be rotated into abutment with the ramped surface 111, which serves as a dwell for the inside edge 86. The handle assembly 96 may include more or less positive stops or dwells than those shown and described.

Figure 9:
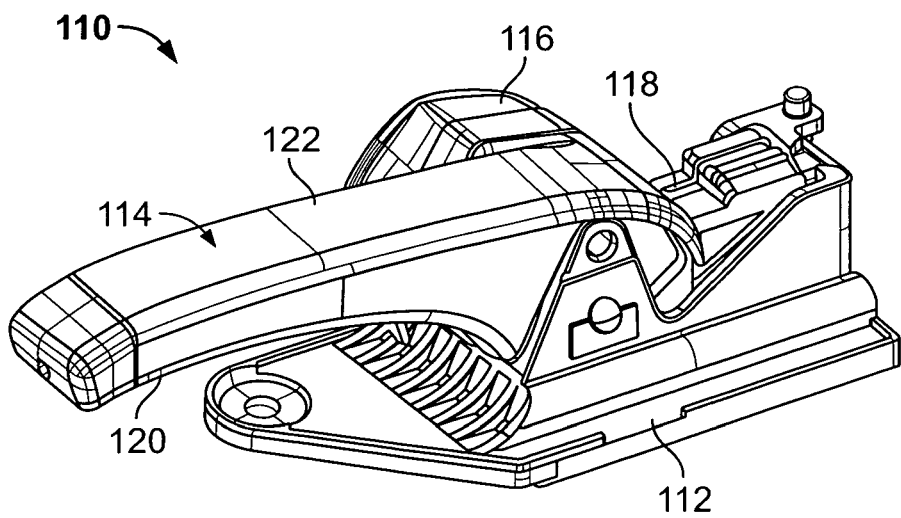
FIG. 9 illustrates an isometric view of a handle assembly according to an embodiment of the present invention.

FIG. 9 illustrates an isometric view of a handle assembly 110 according to an embodiment of the present invention. The handle assembly 110 includes a handle pivot housing 112 that pivotally supports a handle subassembly 114. A lock knob 116 ensures that the handle subassembly 114 remains pivotally secured within the handle pivot housing 112. A counterweight 118 on the opposite side of the pivot axis than the arm 120 of the handle subassembly 114 provides a center of gravity closer to the pivot axis than the distal end of the handle subassembly 114. As shown in FIG. 9, the cap 122 does not include slots formed through lateral surfaces. Instead, the cap 122 may include interior ridges or ledges that snapably secure to reciprocal structures formed in the main handle (covered by cap 122). Additionally, the counterweight 118 may be bulkier and heavier than the counterweight 58 (shown, for example, in FIG. 5). Also, the counterweight 118 may include a downwardly extending rib that mates with a slot (not shown) formed in a counterweight housing or support so that the counterweight 118 may be secured above the counterweight housing or support.

Thus, embodiments of the present invention provide a door handle assembly that remains closed during an impact, despite the overall weight of the door handle. Because embodiments of the present invention provide a door handle assembly having a center of gravity that is closer to the pivot axis, the door handle assembly is less susceptible to accidentally swinging open during an impact, as compared to previous door handles.

Additionally, embodiments of the prevent invention provide a door handle assembly that includes components, such as the handle pivot housing and the main handle, that may be universally used with all door handles. For example, one ornamental handle design may use a first cap with the main handle, while another ornamental design may use a second cap with the main handle. Overall, all portions of the door handle assembly, with the exception of the caps, may be manufactured using the same tools and processes. Moreover, embodiments of the present invention provide a system that may be decorative, yet robust and easy to manufacture.

According to one embodiment of the present invention, an in-mold decorative cap is provided for a door handle assembly. An inlay decorative film is place into a mold. A resin material is shot into the mold so that the film is joined to the resin material through the molding process. A chemical bond is created between the film and resin material to create a thermo-formed cap. The cap is then secured to the main handle to provide a handle subassembly. The handle subassembly is then assembled to the housing. In this way, various decorative caps can be utilized in accordance with the present invention.

While terms such as front, lateral, rear, upper, lower, and the like may be used to describe various components of embodiments of the present invention, it is understood that such terms are relative and are merely to describe components in relation to the drawings. The orientations, however, may be changed, such that the front is rear or lateral, while upper may be lower, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A door handle assembly comprising:
a handle pivot housing comprising handle engaging-walls defining a handle pivot cavity therebetween, at least one of said handle-engaging walls comprising an integrally formed boss extending into said handle pivot cavity;
a main handle comprising an arm having a proximal end and a distal end, wherein said arm is integrally formed with a pivot joint defining a pivot axis closer to said proximal end than said distal end, said pivot joint rotatably securing to said boss, said pivot axis extending between said handle engaging-walls and substantially transverse to said arm, said main handle further comprising a counterweight housing extending from said proximal end;
a cap secured to said main handle that also moves with said handle during operation of said handle when said handle is moved from a closed position to an open position and vice versa, said cap including a first end and a second end positioned over said distal end of said arm, said cap being made of a different material than said main handle; and
a counterweight positioned in said counterweight housing, said counterweight and said distal end of said arm being positioned on opposite sides of said pivot axis, wherein said counterweight further comprises a fin extending upwardly therefrom such that said fin abuts said first end of said cap so as to secure said cap onto said main handle.

2. A door handle assembly comprising:
a handle pivot housing comprising handle engaging-walls defining a handle pivot cavity therebetween, at least one of said handle-engaging walls comprising an integrally formed boss extending into said handle pivot cavity;
a handle comprising an arm having a proximal end and a distal end, wherein said arm is integrally formed with a pivot joint defining a pivot axis closer to said proximal end than said distal end, said pivot joint rotatably securing to said boss, said pivot axis extending between said handle engaging-walls and substantially transverse to said arm, said handle further comprising a counterweight housing extending from said proximal end;
a cap secured to said handle that also moves with said handle during operation of said handle when said handle is moved from a closed position to an open position and vice versa, said cap including a first end and a second end positioned over said distal end of said arm, said cap being formed of a different material than said handle, said cap being an in-mold decorated cap formed as a molded cap with an inlay decorative piece; and a counterweight positioned in said counterweight housing, said counterweight and said distal end of said arm being positioned on opposite sides of said pivot axis, wherein said counterweight further comprises a fin extending upwardly therefrom such that said fin abuts said first end of said cap so as to secure said cap onto said handle.

* * * * *